(No Model.)
R. RABY.
HEDGE FENCE.
No. 459,181. Patented Sept. 8 1891.
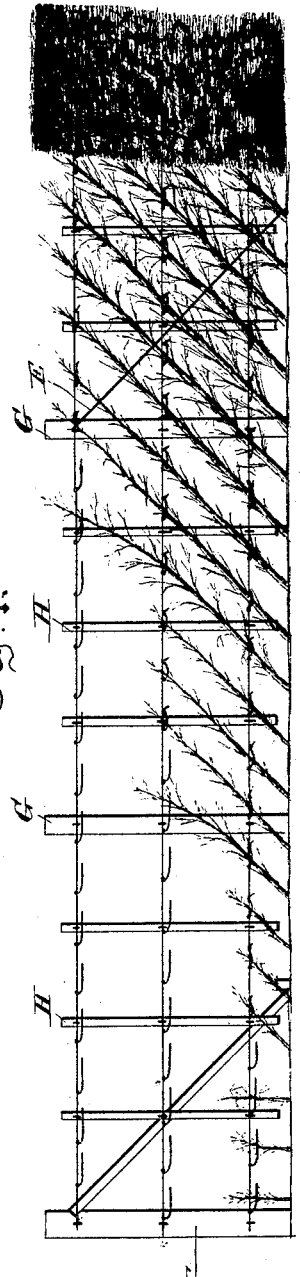
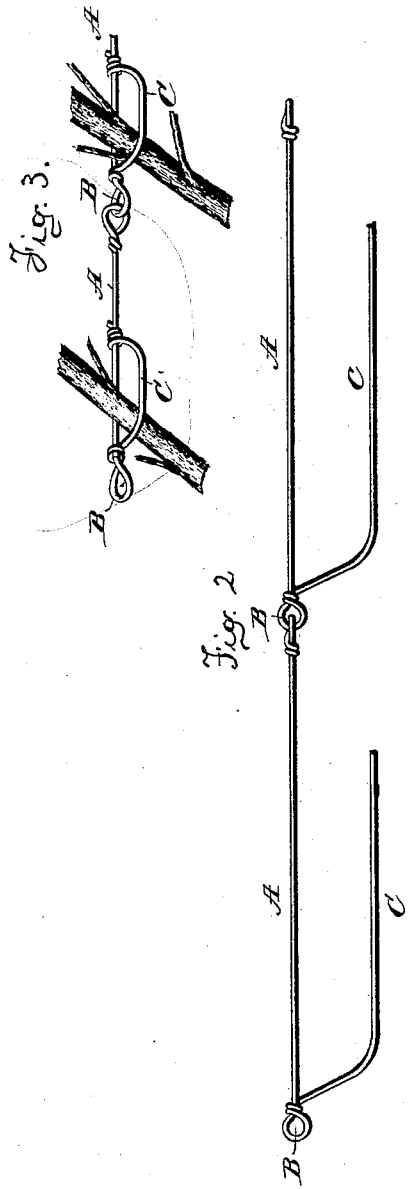
WITNESSES:
E. D. Smith
Alex J. Stewart
INVENTOR
Richard Raby,

UNITED STATES PATENT OFFICE.

RICHARD RABY, OF YORK, PENNSYLVANIA.

HEDGE FENCE.

SPECIFICATION forming part of Letters Patent No. 459,181, dated September 8, 1891.

Application filed January 3, 1891. Serial No. 376,628. (No model.)

*To all whom it may concern:*

Be it known that I, RICHARD RABY, of York, in the county of York and State of Pennsylvania, have invented certain new and useful Improvements in Plashed Hedge Fences; and I do hereby declare the following to be a full, clear, and exact description of the same, reference being had to the accompanying drawings, forming a part of this specification, and to the letters of reference marked thereon.

This invention relates to that class of inventions having for their object the production of what are known as "plashed hedge fences," or fences of growing plants, which are trained in an inclined position, thereby causing the branches to interlock and produce a closely-knitted and almost impenetrable barrier.

The invention consists in a novel form of the training-wire, as will be now described, and pointed out particularly in the appended claim.

In the accompanying drawings, Figure 1 is a side elevation of a section of a fence, showing the same in its various stages of development. Fig. 2 is an enlarged elevation of a short section of the preferred form of wire employed for the line-wires of the fence and to hold the plants. Fig. 3 shows the manner of securing the plants.

Like letters of reference in the several figures indicate the same parts.

In employing my present invention I design to provide a fence from the very start which will serve to confine stock, &c., and to protect the young hedge-plants while reaching their maturity, and in order to carry this idea into effect I first construct a wire fence, employing strands of a special form, to be presently described.

To construct this fence, I employ two end or section posts, such as F, which are braced with an anchor-bar resting on a bolster, and between these end posts, preferably every five rods, are located line-posts G, and between these are located stays H, about one rod apart, the functions of which are to keep the wires from getting out of position and sagging down, &c.

The plants (osage orange or other suitable kind) are set along the line of the fence or the strands are strung over them, and after they have attained the proper growth, preferably one year, as at this stage they are pliable and not liable to be injured by being bent, they are bent over at an angle approximately forty-five degrees and held by the line-wires, each succeeding year's growth being similarly trained and held until the fence reaches its full height.

The wire for holding the plants or canes in an inclined position constitutes the essential point in the present invention, and consists, essentially, of a line-wire having at suitable intervals (equal to the space between each plant) free ends, which are adapted to be passed loosely around the plants and caught on the wire again, holding the plants in a large loop. These free ends are formed integral with or of a portion of the line-wire in any desired manner, whereby the necessity of employing a series of strands is obviated.

In the preferred construction shown in the drawings the line-wire is made up of a series of links or link-sections A, the ends of which are doubled back on themselves to form co-operating eyes B, and at the end of each link the end C of the wire is left free and of proper length to form a loose inclosure for the cane, as shown in Fig. 3. The links are preferably made of a length about equal to the distance between the plants, although it will be understood they may be of any length, so the ends are left at the proper points to be passed around the canes.

The canes are allowed to grow straight for the first year, when they will be above the first strand. Then they are bent down to about an angle of forty-five degrees and the free ends of the wires of the first strand passed around them in a large loop to hold them at that angle without confining them enough to retard the growth. The second year the canes are above the second wire, and they are then side-trimmed and fastened to said wire, and the third year they are topped, trimmed, and fastened to the third or top wire, after which the fence is complete and only needs the regular summer pruning or trimming to get it into the proper shape. This method of procedure enables the plants to be bent when young and pliable without injuring them or necessitating the cutting of the roots or digging away of the earth, or, in fact, doing anything which is liable to retard the growth of the young plants. Hence the fence is completed very much sooner than is possible with fences made according to the prior plans. When the plants are bent down and secured by the free ends, the line-wires are held by guy-wires, such as E, placed every three or four rods and inclined at an angle opposite to that of the plants.

What I claim as my invention, and desire to secure by Letters Patent, is—

In a hedge-training fence, the combination of the strands formed of links of flexible wire united by closed eyes formed by bending the ends of the links back on themselves and twisting them around the body of the link, one of the ends being extended, passed around the plant, and again twisted around the body of the link, forming a closed loop loosely inclosing the plant, substantially as described.

RICHARD RABY.

Witnesses:
BOYD C. WILKINSON,
HENRY R. KRABER.